Oct. 9, 1923.  1,470,244
H. H. PIPER
DUST SHIELD AND COLLECTOR FOR AUTOMOBILES
Filed Oct. 27, 1922    2 Sheets-Sheet 1
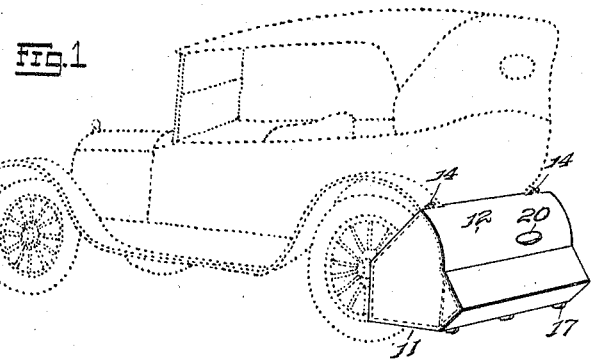
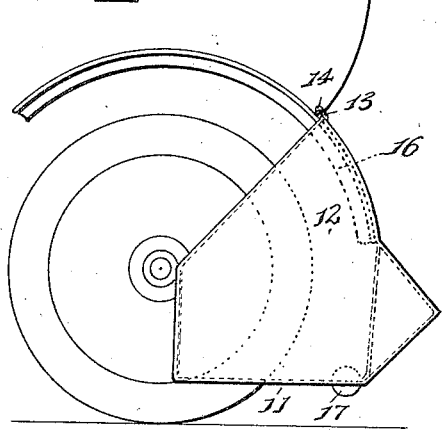
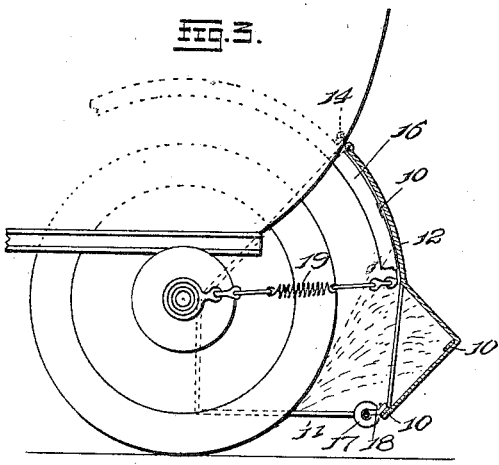
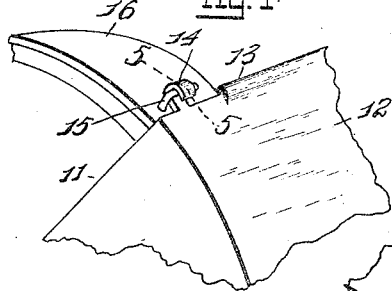
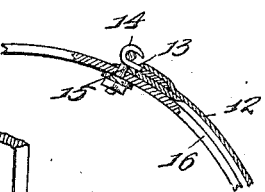
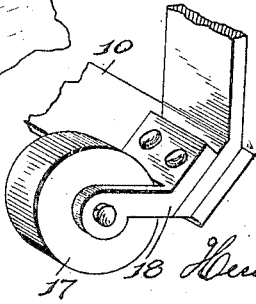
Inventor
Herbert H. Piper

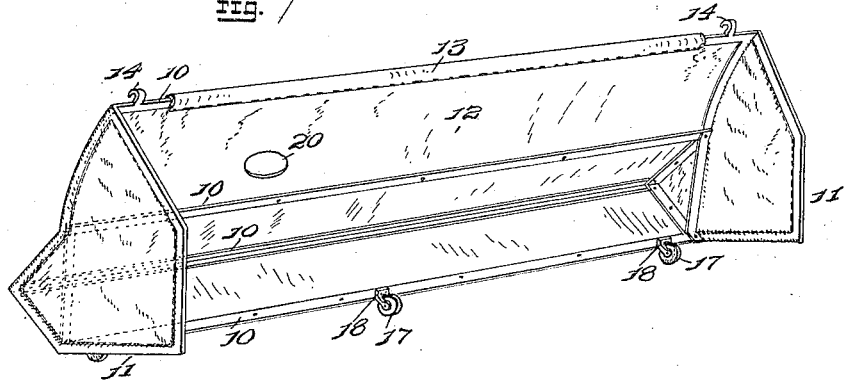
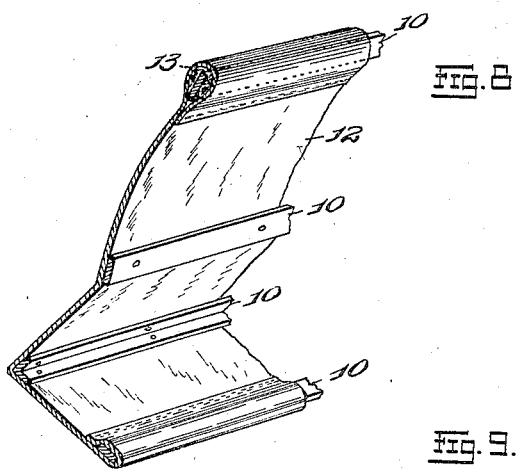
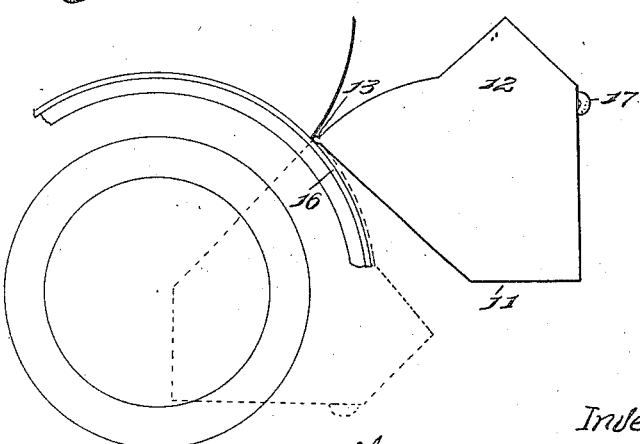

Patented Oct. 9, 1923.

1,470,244

UNITED STATES PATENT OFFICE.

HERBERT H. PIPER, OF JACKSON, MISSOURI.

DUST SHIELD AND COLLECTOR FOR AUTOMOBILES.

Application filed October 27, 1922. Serial No. 597,235.

*To all whom it may concern:*

Be it known that I, HERBERT H. PIPER, a citizen of the United States, and resident of Jackson, Cape Girardeau County, Missouri, have invented certain new and useful Improvements in a Dust Shield and Collector for Automobiles, of which the following is a specification.

This invention relates to improvements in a dust shield and collector for automobiles and it has for its object a means attached to the rear of an automobile by which the dust agitated by the moving machine is prevented from raising in clouds back of the moving vehicle.

A further object of my invention is to equip a vehicle with a shield of light durable noiseless construction and is designed to deflect and catch the dust raised by the centrifugal action of the rear wheels and preventing said dust from raising in clouds at the rear.

The device is conveniently attached to the rear fenders, and can be readily removed when desiring to clean the same.

Figure 1 is a perspective view of my invention shown in position on the rear of an automobile.

Figure 2 is a side view of the same.

Figure 3 is a central vertical sectional view of the same.

Figure 4 is a detail perspective view of a portion of the shield showing the mode of attachment to the fender.

Figure 5 is sectional view taken on the line 5—5 of Figure 4.

Figure 6 is a detail perspective view of one of the rollers made use of in connection with my invention.

Figure 7 is an inside perspective view of my improved shield.

Figure 8 is a sectional perspective of a portion of my invention showing the frame and covering thereon.

Figure 9 is a side view showing the mode of applying or removing the shield.

In the general construction of my invention I construct a shield consisting of a suitable frame comprising parallel bars 10, and a side extension frame 11 on each end.

Over the frame is placed a covering 12 composed preferably of light durable noiseless material such for example as canvas, rubber ducking or the like and such material is attached to the frame in any desirable manner well known to the trade.

The upper edge of the frame is provided with a cushion 13 which contacts with the body of the machine and acts as a dust proof joint as well as to prevent marring the body; on each side of the cushion and on the upper bar 10 is formed a hook 14 which is designed to be hooked into a loop 15 formed on the fender, and by this means the shield is suspended in position and it is supported on the rear ends of the fender 16.

On the bottom rail or bar 10 I provide a plurality of rollers 17, mounted in brackets 18 which are securely fastened to the rail 10 and are used to raise the shield should the same come in contact with an obstruction or irregularity in the road, it thus prevents the marring of the shield proper.

In order to keep the shield in taut position I equip the same with a spring attachment 19 connecting the frame of the shield with the rear axle and the same is provided with snaps or like devices so that the same may be easily released when desiring to remove the shield from the car.

The invention is simple in construction, of light material, and noiseless, and it catches the dust agitated by the rear wheels and permits the dust to fall back on the road without causing a cloud to follow the moving vehicle.

In the cover I provide a reasonable opening 20 which will correspond to the filling opening of the gasoline tank, this opening may be covered with a flap if desired.

Having fully described my invention, what I claim, is.

1. A dust shield and collector for automobiles, comprising a shield attached to the rear portion of an automobile, said shield having side extensions covering the rear side of the hind wheels and positioned to catch the dust agitated by the moving wheels, and a flexible connection between the shield and rear axle, substantially as specified.

2. A device of the character described comprising a frame extending the entire width of an automobile, side extensions on each end, a covering place over the frame and side extensions, fastening devices formed on the frame for attaching the frame to the fenders, rollers carried by the bottom of the frame and a resilient means for holding the device from rattling.

3. An article of the class described comprising a frame of light durable material the same having side extensions to pass on the side of the wheels of a vehicle, a covering placed over and supported by the frame, rollers attached to the bottom rail of the frame, hooks formed on the frame for attaching the frame to loops formed on the fenders, and a spring controlled supporting device connecting the shield with the under part of the vehicle, substantially as specified.

In testimony whereof I have signed my name to this specification, in presence of two subscribing witnesses.

HERBERT H. PIPER.

Witnesses:
 ALFRED A. EICKS,
 B. M. MANNE.